United States Patent
Muratov et al.

(10) Patent No.: US 11,476,721 B2
(45) Date of Patent: Oct. 18, 2022

(54) ROBUST FOREIGN OBJECTS DETECTION

(71) Applicant: MediaTek Inc., Hsin-Chu (TW)

(72) Inventors: Vladimir Alexander Muratov, San Jose, CA (US); Patrick Stanley Riehl, Lynnfield, MA (US); William Plumb, Charlestown, MA (US)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 17/142,953

(22) Filed: Jan. 6, 2021

(65) Prior Publication Data

US 2021/0242724 A1 Aug. 5, 2021

Related U.S. Application Data

(63) Continuation of application No. 16/228,556, filed on Dec. 20, 2018, now Pat. No. 10,916,972, which is a continuation of application No. 15/244,107, filed on Aug. 23, 2016, now Pat. No. 10,199,881.

(60) Provisional application No. 62/245,378, filed on Oct. 23, 2015, provisional application No. 62/245,381, filed on Oct. 23, 2015.

(51) Int. Cl.
*H02J 50/60* (2016.01)
*H02J 50/12* (2016.01)
*H02J 50/10* (2016.01)
*H02J 7/02* (2016.01)

(52) U.S. Cl.
CPC ............ *H02J 50/60* (2016.02); *H02J 7/025* (2013.01); *H02J 50/10* (2016.02); *H02J 50/12* (2016.02)

(58) Field of Classification Search
CPC .. H02J 50/10; H02J 50/12; H02J 50/60; H02J 7/025

USPC ...................................................... 307/104
See application file for complete search history.

(56) References Cited

U.S. PATENT DOCUMENTS

| | | | |
|---|---|---|---|
| 9,057,753 B2 | 6/2015 | Nakano et al. | |
| 9,178,361 B2 | 11/2015 | Liu et al. | |
| 9,294,153 B2 | 3/2016 | Muratov et al. | |
| 9,360,456 B2 | 6/2016 | Miyamoto | |
| 9,806,769 B2 | 10/2017 | Nakano et al. | |
| 10,199,881 B2 | 2/2019 | Muratov et al. | |
| 10,530,196 B2 | 1/2020 | Oettinger et al. | |

(Continued)

FOREIGN PATENT DOCUMENTS

| | | |
|---|---|---|
| CN | 105474511 A | 4/2016 |
| CN | 106463973 A | 2/2017 |

(Continued)

OTHER PUBLICATIONS

Extended European Search Report for European Application No. EP 16194876.5 dated Mar. 24, 2017.

(Continued)

*Primary Examiner* — Hal Kaplan
(74) *Attorney, Agent, or Firm* — Wolf, Greenfield & Sacks, P.C.

(57) ABSTRACT

An apparatus and method for performing foreign object detection for a wireless power transmitter. A matching network and transmit coil are energized, and a resonance is excited. The resonance is allowed to decay. A temporal characteristic of the decay is measured. The temporal characteristic is analyzed to determine whether a foreign object is coupled to an electromagnetic field generated by the transmit coil.

20 Claims, 20 Drawing Sheets

(56) References Cited

U.S. PATENT DOCUMENTS

| | | |
|---|---|---|
| 10,581,281 B2 | 3/2020 | Muratov |
| 10,868,446 B2 | 12/2020 | Muratov et al. |
| 10,916,972 B2 | 2/2021 | Muratov et al. |
| 2010/0001847 A1 | 1/2010 | Takaishi et al. |
| 2011/0196544 A1 | 8/2011 | Baarman et al. |
| 2012/0147802 A1 | 6/2012 | Ukita et al. |
| 2012/0161538 A1 | 6/2012 | Kinoshita et al. |
| 2012/0326660 A1 | 12/2012 | Lu et al. |
| 2013/0241302 A1 | 9/2013 | Miyamoto et al. |
| 2014/0077617 A1 | 3/2014 | Nakano et al. |
| 2014/0084857 A1 | 3/2014 | Liu et al. |
| 2014/0111019 A1 | 4/2014 | Roy et al. |
| 2014/0191715 A1 | 7/2014 | Wechlin et al. |
| 2014/0327393 A1 | 11/2014 | Lee et al. |
| 2015/0073768 A1* | 3/2015 | Kurs .................. G06F 30/367 703/13 |
| 2015/0155095 A1 | 6/2015 | Wu et al. |
| 2015/0285926 A1 | 10/2015 | Oettinger |
| 2015/0309126 A1 | 10/2015 | Jung et al. |
| 2015/0323694 A1 | 11/2015 | Roy et al. |
| 2015/0331135 A1 | 11/2015 | Widmer |
| 2017/0047777 A1 | 2/2017 | Nakano et al. |
| 2017/0117755 A1 | 4/2017 | Muratov et al. |
| 2017/0117756 A1 | 4/2017 | Muratov |
| 2017/0149287 A1 | 5/2017 | Nakano et al. |
| 2017/0187238 A1 | 6/2017 | Chong et al. |
| 2017/0229926 A1 | 8/2017 | Oettinger et al. |
| 2017/0310166 A1 | 10/2017 | Huang et al. |
| 2018/0241257 A1 | 8/2018 | Muratov et al. |
| 2018/0342898 A1 | 11/2018 | Ikefuji |
| 2019/0131826 A1 | 5/2019 | Park et al. |
| 2019/0199142 A1 | 6/2019 | Muratov et al. |
| 2020/0259373 A1 | 8/2020 | Park et al. |
| 2020/0328625 A1 | 10/2020 | Mills |
| 2021/0057939 A1 | 2/2021 | Muratov et al. |

FOREIGN PATENT DOCUMENTS

| | | |
|---|---|---|
| EP | 3093955 A1 | 11/2016 |
| EP | 3107188 A1 | 12/2016 |
| EP | 3 123 587 B1 | 2/2017 |
| EP | 3160008 A1 | 4/2017 |
| KR | 10-2011-0051727 A | 5/2011 |
| KR | 10-2017-0118571 A | 10/2017 |
| KR | 2018-0022513 A | 3/2018 |
| KR | 2018-0065693 A | 6/2018 |
| TW | 2010-01866 A | 1/2010 |
| TW | 1506916 B | 11/2015 |
| WO | WO 2005/109598 A1 | 11/2005 |
| WO | WO 2009/081115 A1 | 7/2009 |
| WO | WO 2013/164831 A1 | 11/2013 |
| WO | WO 2013/190809 A1 | 12/2013 |
| WO | WO 2015/029370 A1 | 3/2015 |
| WO | WO 2016/006441 A1 | 1/2016 |
| WO | WO 2017/064955 A1 | 4/2017 |

OTHER PUBLICATIONS

Extended European Search Report for European Application No. EP 18168832.6 dated Jun. 18, 2018.
Extended European Search Report for European Application No. EP 19204947.6 dated Jun. 12, 2020.
Partial European Search Report for European Application No. EP 19204947.6 dated Apr. 24, 2020.
Extended European Search Report for European Application No. EP 19838641.9 dated Feb. 23, 2022.
Extended European Search Report for European Application No. EP 19838135.2 dated Feb. 23, 2022.

* cited by examiner

ROBUST FOREIGN OBJECTS DETECTION

CROSS-REFERENCE TO RELATED APPLICATIONS

This application is a continuation of U.S. patent application Ser. No. 16/228,556, filed Dec. 20, 2018, titled "ROBUST FOREIGN OBJECTS DETECTION," which is a continuation of U.S. patent application Ser. No. 15/244,107, filed Aug. 23, 2016, entitled "ROBUST FOREIGN OBJECTS DETECTION," which claims priority to U.S. provisional application Ser. No. 62/245,378, filed Oct. 23, 2015, titled "FOREIGN OBJECTS DETECTION," and U.S. provisional application Ser. No. 62/245,381, filed Oct. 23, 2015, titled "ROBUST FOREIGN OBJECT DETECTION," each of which is hereby incorporated by reference in its entirety.

BACKGROUND

1. Technical Field

The techniques described herein relate generally to wireless power delivery, and particularly to detection of foreign objects in the field produced by a wireless power transmitter.

2. Discussion of the Related Art

Wireless Power Transfer Systems (WPTS) are gaining increasing popularity as convenient way to deliver power without wires or connectors. WPTS currently under development in the industry can be separated in two major classes: magnetic induction (MI) systems and magnetic resonance (MR) systems. Both types of systems include a wireless power transmitter and a wireless power receiver. Such systems can be used to power or charge mobile devices such as smartphones or tablet computers, among other applications.

Inductive WPTS typically operate in an allocated frequency range of several hundred kilohertz using frequency variation as a power flow control mechanism. MR WPTS typically operate on a single resonant frequency using input voltage regulation to regulate output power. In typical applications, MR WPTS operate at a frequency of 6.78 MHz.

Several industry committees have been working on developing international standards for consumer products based on wireless power transfer.

SUMMARY

Some embodiments relate to a foreign object detection method for a wireless power transmitter having a matching network and transmit coil. The method includes (A) energizing the matching network and transmit coil and exciting resonance between the matching network and transmit coil; (B) allowing the resonance to decay; (C) measuring a temporal characteristic of the decay; and (D) analyzing the temporal characteristic to determine whether a foreign object is coupled to an electromagnetic field generated by the transmit coil.

Some embodiments relate to at least one non-transitory computer readable storage medium having stored thereon instructions, which, when executed by a processor, perform the foreign object detection method.

Some embodiments relate to an apparatus for performing foreign object detection for a wireless power transmitter having a matching network and transmit coil. The apparatus includes circuitry configured to: (A) energize the matching network and transmit coil and excite resonance between the matching network and transmit coil; (B) allow the resonance to decay; (C) measure a temporal characteristic of the decay; and (D) analyze the temporal characteristic to determine whether a foreign object is coupled to an electromagnetic field generated by the transmit coil.

Some embodiments relate to an apparatus for driving a wireless power transmitter and performing foreign object detection. The apparatus includes a drive circuit configured to energize a matching network and transmit coil of the wireless power transmitter, excite resonance between the matching network and transmit coil, and allow the resonance to decay. The apparatus also includes a controller configured to measure a temporal characteristic of the decay and analyze the temporal characteristic to determine whether a foreign object is coupled to an electromagnetic field generated by the transmit coil.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

Wireless power transfer can be degraded due to the presence of a foreign object in the field produced by the wireless power transmitter. Conductive objects such as metallic objects may absorb power due to the inducement of eddy currents in the conductive object. The presence of such an object can significantly degrade the efficiency of the wireless power transmission. If a metal object is present, efficiency may be reduced substantially (e.g., from 90% to 40%). Further, due to the power absorbed, the temperature of the object may increase significantly, which may be undesirable. Techniques have been developed for sensing the presence of a foreign object. However, prior techniques for sensing the presence of foreign objects have various disadvantages, including limited detection capability at low power levels, a lengthy detection process which wastes power, and/or the need to add additional circuitry or coils which lead to additional complexity and expense.

The techniques and devices described herein enable the detection of a foreign object using relatively low power levels. In some embodiments, detection may be performed by energizing and controlling the drive circuit of a wireless power transmitter, and measuring a characteristic of a transient in the wireless power transmitter. Based on the transient characteristic the wireless power transmitter can determine whether a foreign object is present in the field produced by the wireless power transmitter. Advantageously, in some embodiments detection of a foreign object may be performed without the need to add additional hardware.

Figure 1:
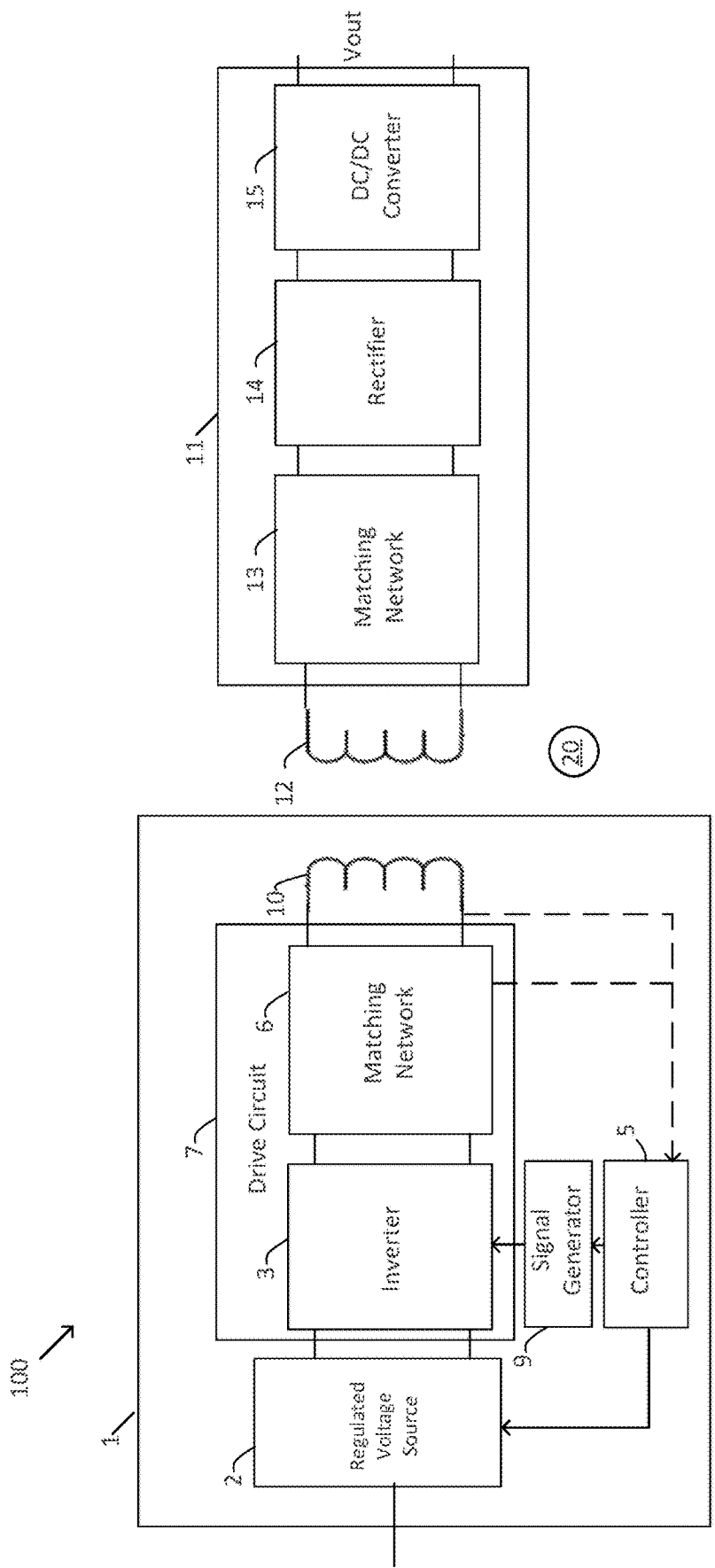
FIG. 1 shows a block diagram of a wireless power system including a wireless power transmitter and a wireless power receiver.

FIG. 1 shows a block diagram of a wireless power system 100 including a wireless power transmitter 1 and a wireless power receiver 11. The wireless power transmitter 1 has a drive circuit 7 including an inverter 3 that drives a transmit coil 10 through a matching network 6. The wireless power transmitter 1 may include a regulated voltage source 2 (e.g., a voltage regulator) that provides a regulated DC voltage to the inverter 3. The regulated voltage source 2 produces a regulated DC output voltage in response to control stimulus from the controller 5. In some embodiments, the drive circuit 7 may be a class D or E amplifier that converts the DC voltage at the input of inverter 3 into an AC output voltage to drive the transmit coil 10. Producing an AC output voltage enables wireless power transmission through electromagnetic induction. The controller 5 may control a signal generator 9 to drive the inverter 3 with signals of a selected wireless power transmission frequency. As an example, the inverter 3 may be switched at a frequency between 100 and 205 kHz to transmit power to a wireless power receiver designed to receive wireless power according to the Qi specification for low power Qi receivers and 80-300 kHz for medium power Qi receivers. The inverter 3 may be switched at a higher frequency, such as a frequency of greater than 1 MHz, within an ISM band, e.g., 6.765 MHz to 6.795 MHz, to transmit power to a receiver designed to receive wireless power using MR technology. However, these frequencies are described merely by way of example, as wireless power may be transmitted at a variety of suitable frequencies, in accordance with any suitable specification. Controller 5 may be an analog circuit or a digital circuit. Controller 5 may be programmable, and may command signal generator 9 to produce signals at a desired transmission frequency based on stored program instructions, so that inverter 3 switches at the desired transmission frequency. Matching network 6 may facilitate wireless power delivery by presenting a suitable impedance to the inverter 3. The matching network(s) may have one or more capacitive or inductive elements or any suitable combination of capacitive and inductive elements. Since the transmit coil 10 may have an inductive impedance, in some embodiments the matching network 6 may include one or more capacitive elements, which, when combined with the impedance(s) of the transmit coil 10, presents an impedance to the output of inverter 3 suitable for driving the transmit coil 10. In some embodiments, during wireless power transfer the resonant frequency of the matching network 6 may be set equal to or approximately equal to the switching frequency of the inverter 3. The transmit coil 10 may be realized by any suitable type of conductors. The conductors may be wires, including solid wire or Litz wire, or patterned conductors, such as patterned conductors of a PC board or an integrated circuit.

The AC current in the transmit coil 10 generates an oscillating magnetic field in accordance with Ampere's law. The oscillating magnetic field induces an AC voltage into a receiver coil 12 of the wireless power receiver 11 in accordance with Faraday's law. The AC voltage induced in the receiver coil 12 is provided through a matching network 13 to a rectifier 14 that generates an unregulated DC voltage. Rectifier 14 may be a synchronous rectifier or may be implemented using diodes. The unregulated DC voltage is regulated using a DC/DC converter 15, the output of which may be filtered and provided to a load as output voltage Vout. In some alternate embodiments the DC/DC converter 15 can be replaced by a linear regulator or battery charger, or eliminated altogether.

As shown in FIG. 1, if a conductive foreign object 20 enters the field produced by the transmit coil 10 of the wireless power transmitter 1, the wireless power transmission efficiency may be degraded and/or the conductive foreign object 20 may undergo significant heating. Examples of conductive foreign objects 20 include coins, paperclips, keys, by way of illustration.

According to the techniques described herein, the wireless power transmitter 1 may be controlled to perform foreign object detection prior to wireless power transmission. Performing foreign object detection allows the wireless power transmitter to determine whether or not to perform wireless power transmission.

Foreign object detection may be performed as follows. When the wireless power transmitter 1 performs foreign object detection it may increase the energy stored in one or more components of the matching network 6 and/or transmit coil 10. A resonance in matching network 6 and/or transmit coil 10 is excited and allowed to decay. A temporal characteristic of the decay of the resonance is measured. Since the rate of decay of the resonance is different depending on whether or not a foreign object 20 is present, the temporal characteristic of the resonance decay can be analyzed to determine whether or not a foreign object 20 is present. Wireless power transmission can be enabled or inhibited based on this analysis. If a foreign object is determined to be present, wireless power transmission can be disabled. If a foreign object is determined not to be present, wireless power transmission may be enabled.

Figure 2:
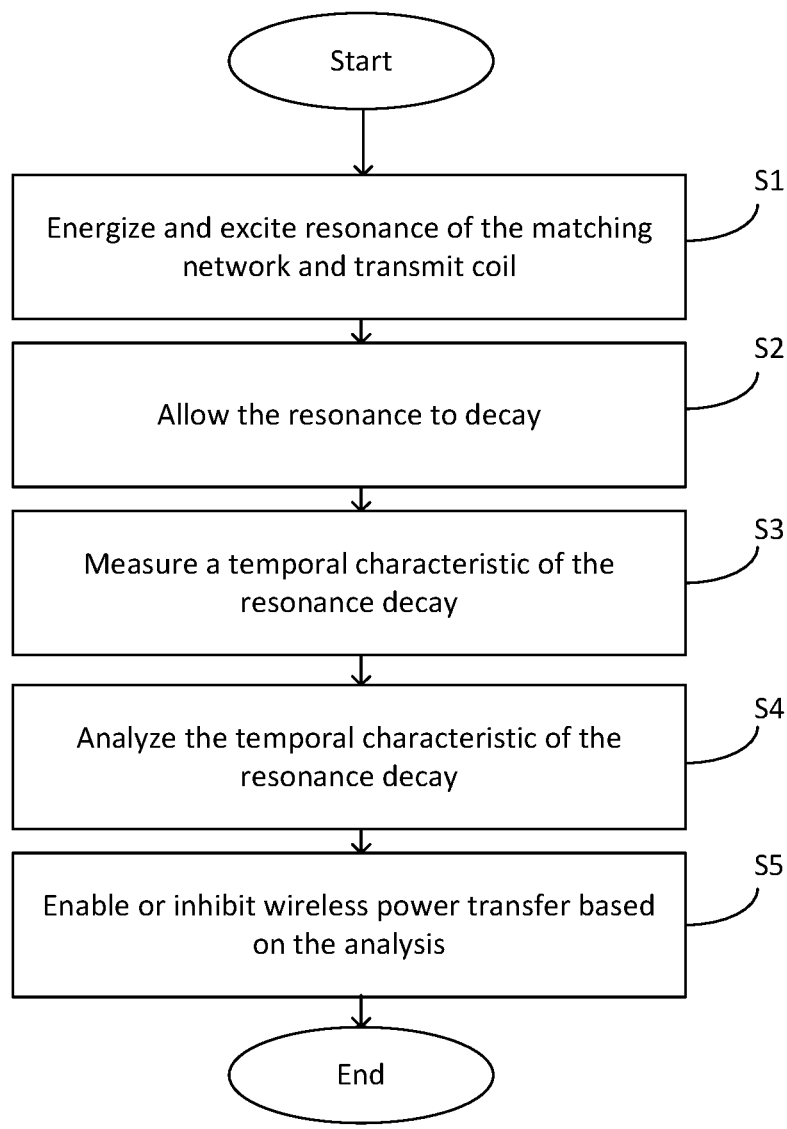
FIG. 2 shows a flowchart of a method of performing foreign object detection.

FIG. 2 shows a flowchart of a method of performing foreign object detection, according to some embodiments. Such a method may be performed by the wireless power transmitter 1. Specifically, controller 5 may be configured to control performing the method. In step S1, the matching network 6 and/or the transmit coil 10 is energized. Step S1 may be performed by increasing the energy stored in one or more passive components in the matching network 6 and/or transmit coil 10. Matching network 6 and/or the transmit coil 10 may be energized by switching inverter 3 while inverter 3 is powered by a suitable supply voltage. Examples of suitable switching frequencies and supply voltages are discussed below. However, the network 6 and/or the transmit coil 10 need not be energized by switching the inverter at a switching frequency. To increase the energy stored, a voltage may be applied across a capacitor of the matching network 6 to increase the energy stored in the capacitor, a current may be applied to the transmit coil 10 which may increase the energy stored in its inductance, or the energy stored in both may be increased. In some embodiments, when the wireless power transmitter is energized in the foreign object detection mode it is energized at a lower level than when in the wireless power transmitter is in the power transmission mode. A lower voltage and/or current may be applied to the matching network 6 and/or the transmit coil 10 as compared to the voltage and/or current applied in the power transmission mode, which can limit the power consumed for foreign object detection.

The resonance may be excited by switching one or more switches of the inverter 3 into a state that causes a capacitor of the matching network 6 to resonate with the inductance of the transmit coil 10. For example, the inverter may be switched at a suitable switching frequency. When the resonance is excited the capacitor of the matching network 6 exchanges energy with the inductance of the transmit coil 10 at the resonant frequency.

In step S2, the resonance between the matching network and transmit coil is allowed to decay. Energy transfer into matching network and transmit coil may be inhibited in step S2, so that the matching network and transmit coil can resonate freely without the addition of energy. As an example, if step S1 includes switching the inverter 3 at a switching frequency, the switching may be stopped in step S2, and the inverter kept in a state that does not allow energy to flow into the matching network or transmit coil. For example, the output of the inverter may be held in a low impedance state. The output voltage may be held constant at a fixed voltage (e.g., a common mode voltage such as ground, or VDC) by turning on the appropriate transistor(s) of the inverter. The resonance is allowed to decay freely. If a foreign conductive object 20 is present in the field produced by transmit coil 10, eddy currents are induced in the object 20 which loads the resonant network formed by the matching network 6 and transmit coil 10, causing the resonance to decay more rapidly than if no foreign object is present. Accordingly, the speed of decay of the resonance is indicative of whether a foreign conductive object 20 is present.

In step S3, a temporal characteristic of the resonance decay may be measured. As should be appreciated, step S3 may be performed at least partially at the same time as step S2. To measure a temporal characteristic of the resonance decay, one or more measurements of the matching network 6 and/or transmit coil 10 may be made to detect how quickly the resonance changes. The measurement(s) may be made by controller 5, which may include suitable measurement circuitry, or a separate measurement circuit. Any suitable parameters may be measured, such as the current or voltage, for example. As shown by the dashed lines in FIG. 1, the measurement(s) may be made at the matching network 6 and/or the transmit coil 10.

In some embodiments, the decay may be exponential, and the speed of the decay may be represented by a time constant. Determining the temporal characteristic may include measuring a time constant or a value indicative thereof. In some embodiments, the temporal characteristic may be determined by calculating a ratio of the currents or voltages as they decay over time.

In step S4, the temporal characteristic may be analyzed to determine whether it is indicative of the presence of a foreign object. In some embodiments, the quality factor Q of the wireless power transmitter 1 may be determined based on the temporal characteristic and/or the measurements themselves. As an example of the analysis that may be performed in step S4, the temporal characteristic or quality factor Q may be compared to data indicating expected temporal factors or quality factors Q. For example the wireless power transmitter 1 may store data (e.g., in non-volatile memory) representing quality factors Q of known wireless power receivers. The quality factor Q determined from the measured temporal characteristic may be compared with the stored data, and if it differs from the expected value(s) by more than a threshold amount the measured quality factor may be indicative of the presence of a foreign conductive object 20. As another example, the wireless power transmitter 1 may receive data from the wireless power receiver 11 indicating the quality factor Q of the wireless power receiver 11. The quality factor Q determined from the measured temporal characteristic may be compared with the received quality factor Q of the receiver, and if it differs from that of the receiver by more than a threshold amount the measured quality factor may be indicative of the presence of a foreign conductive object 20.

Figure 3A:
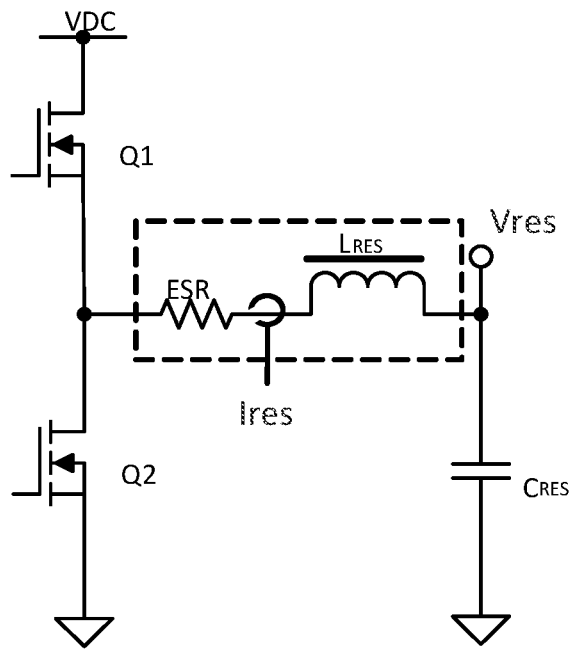
FIGS. 3A-3C show examples of a drive circuit implemented as class D amplifiers.
Figure 3B:
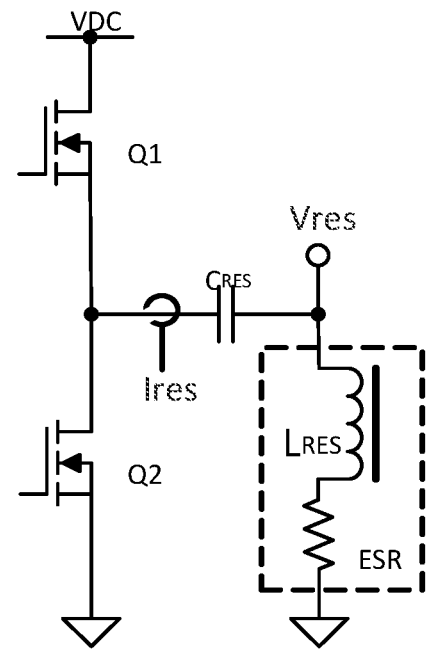
Figure 3C:
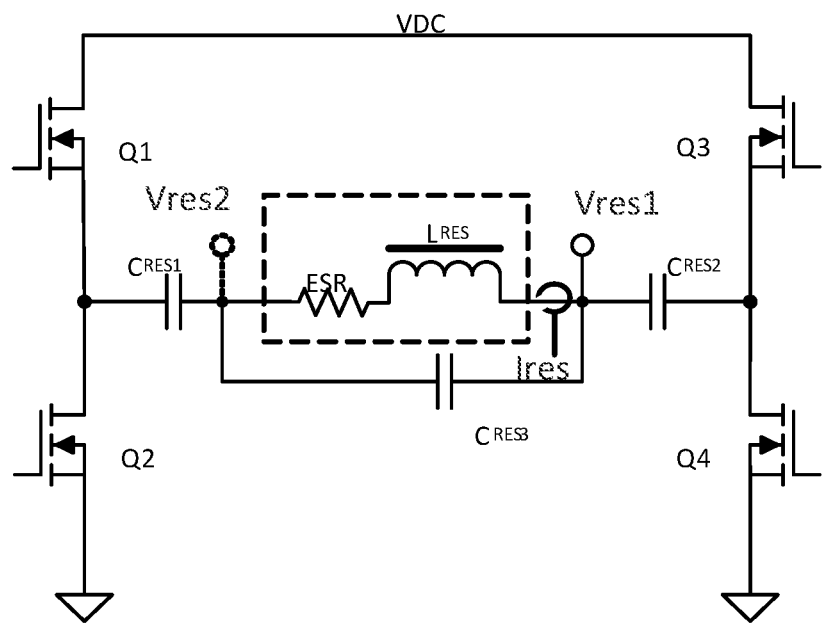
Figure 4A:
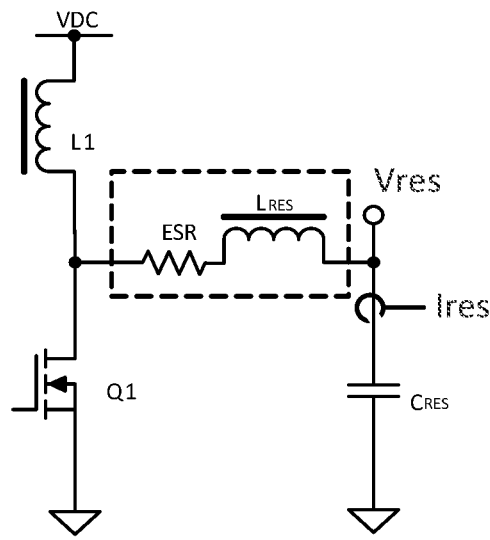
FIGS. 4A-4C show examples of a drive circuit implemented as class E amplifiers.
Figure 4B:
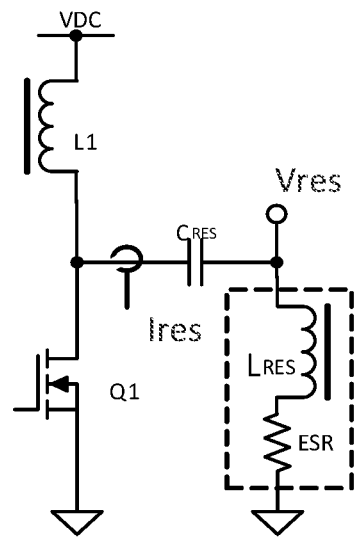
Figure 4C:
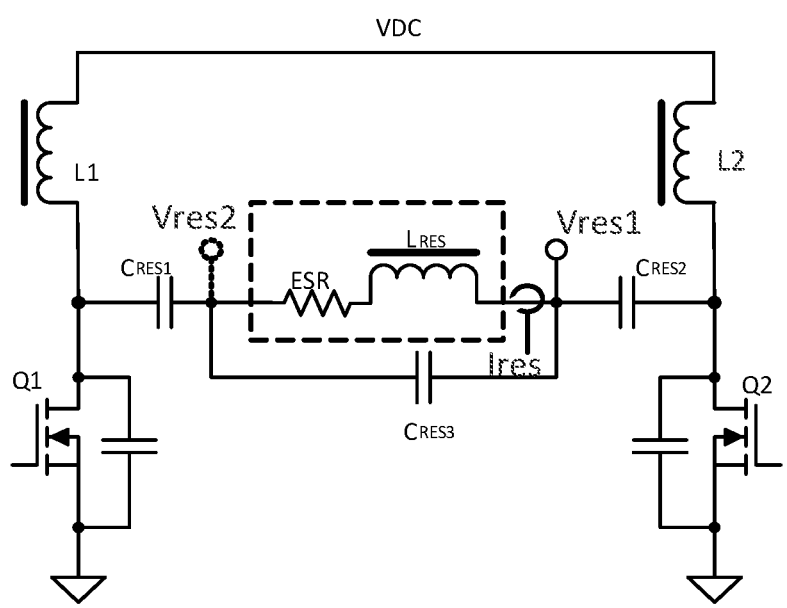

In step S5, wireless power transmission by the wireless power transmitter 1 may be enabled or inhibited based on the result of the analysis. If the measured temporal parameter or quality factor Q is outside of an acceptable range, wireless power transmission may be inhibited. If the measured decay is within an acceptable range, power transmission may be enabled, and the wireless power transmitter 1 may be allowed to enter the power transmission mode. The quality factor Q considered acceptable may be based on quality factor provided by a wireless power receiver to the wireless power transmitter via in-band or out-of-band communication FIGS. 3A-3C show examples of drive circuit 7 implemented as class D amplifiers. FIGS. 3A and 3B show a single ended (half-bridge) configuration in which inverter 3 is implemented by transistors Q1 and Q2, matching network 6 is implemented by capacitor $C_{RES}$. Transmit coil 10 is represented by inductor $L_{RES}$ and an equivalent series resistance (ESR). FIG. 3C shows a differential (full-bridge) configuration in which inverter 3 is implemented by transistors Q1-Q4, matching network 6 is implemented by capacitors $C_{RES1}$, $C_{RES2}$ and $C_{RES3}$. The drive circuit 7 is powered by a DC supply voltage VDC. FIGS. 4A-4C show examples of drive circuit 7 implemented as class E amplifiers.

Figure 5:
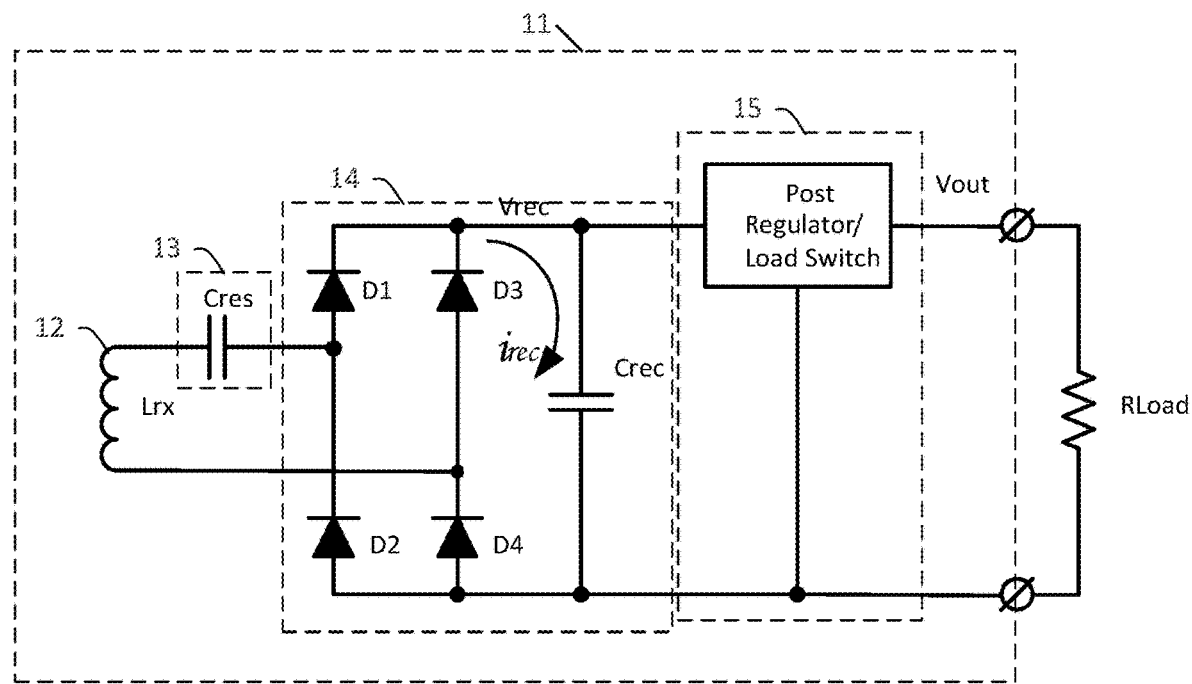
FIG. 5 shows an example of wireless power reception circuitry for a wireless power receiver.

FIG. 5 shows an example of wireless power reception circuitry for a wireless power receiver 11. Matching network 13 is implemented by a capacitor $C_{RES}$. Rectifier 14 is implemented by a full-bridge diode rectifier with an output filter capacitor Crec having a voltage Vrec across it. DC/DC converter 15 is implemented by a post regulator/load switch that produces $V_{out}$.

Having shown examples of drive circuit 7 and an example of wireless power reception circuitry for a wireless power receiver 11, examples of ways in which the method of FIG. 2 may be applied thereto will be described.

Referring again to FIG. 2, and as discussed above, step S1 involves increasing the energy stored in matching network 6 and/or transmit coil 10 and exciting their resonance. In the context of the drive circuits of FIGS. 3 and 4, step S1 may include increasing the energy stored in any one or more of the capacitive or inductive elements of the drive circuit 7. Initially, the energy stored in drive circuit 7 may be zero. However, the techniques described herein are not limited to starting with zero energy stored in the drive circuit 7. In some embodiments, energy may be transferred to the drive circuit 7 by switching one or more transistors of the inverter 3 to provide energy to the capacitor(s) and/or inductor(s) of the drive circuit 7 from the supply voltage VDC.

As an example, the switches of the inverter 3 may be switched at a selected switching frequency to transfer energy into the drive circuit 7. The amount of energy transferred to the drive circuit 7 by switching the inverter 3 depends upon the magnitude of the supply voltage VDC, the switching frequency, and the amount of time for which the switching occurs. In some embodiments, it is desirable to limit the amount of energy transferred to the drive circuit to limit power dissipation when performing foreign object detection. The amount of energy transferred may be limited by setting VDC at a lower voltage during foreign object detection as compared to its value during power transmission. Alternatively or additionally, the switching frequency may be selected to control the amount of energy transferred. The farther away the switching frequency of the inverter 3 is from the resonant frequency of the drive circuit 7, the less energy will be transferred into the drive circuit 7 per unit time. The amount of time for which inverter 3 is switched also affects the amount of energy transferred. Reducing the amount of time for which inverter 3 is switched can reduce the amount of energy transferred to drive circuit 7. However, the techniques described herein are not limited to transferring energy into the drive circuit 7 by switching the inverter 3, as in some embodiments energy transfer to the drive circuit 7 may be performed by connecting the passive component(s) of drive circuit 7 to VDC (e.g., through inverter 3), or a separate circuit may be used to provide energy to the passive component(s).

Figure 6:
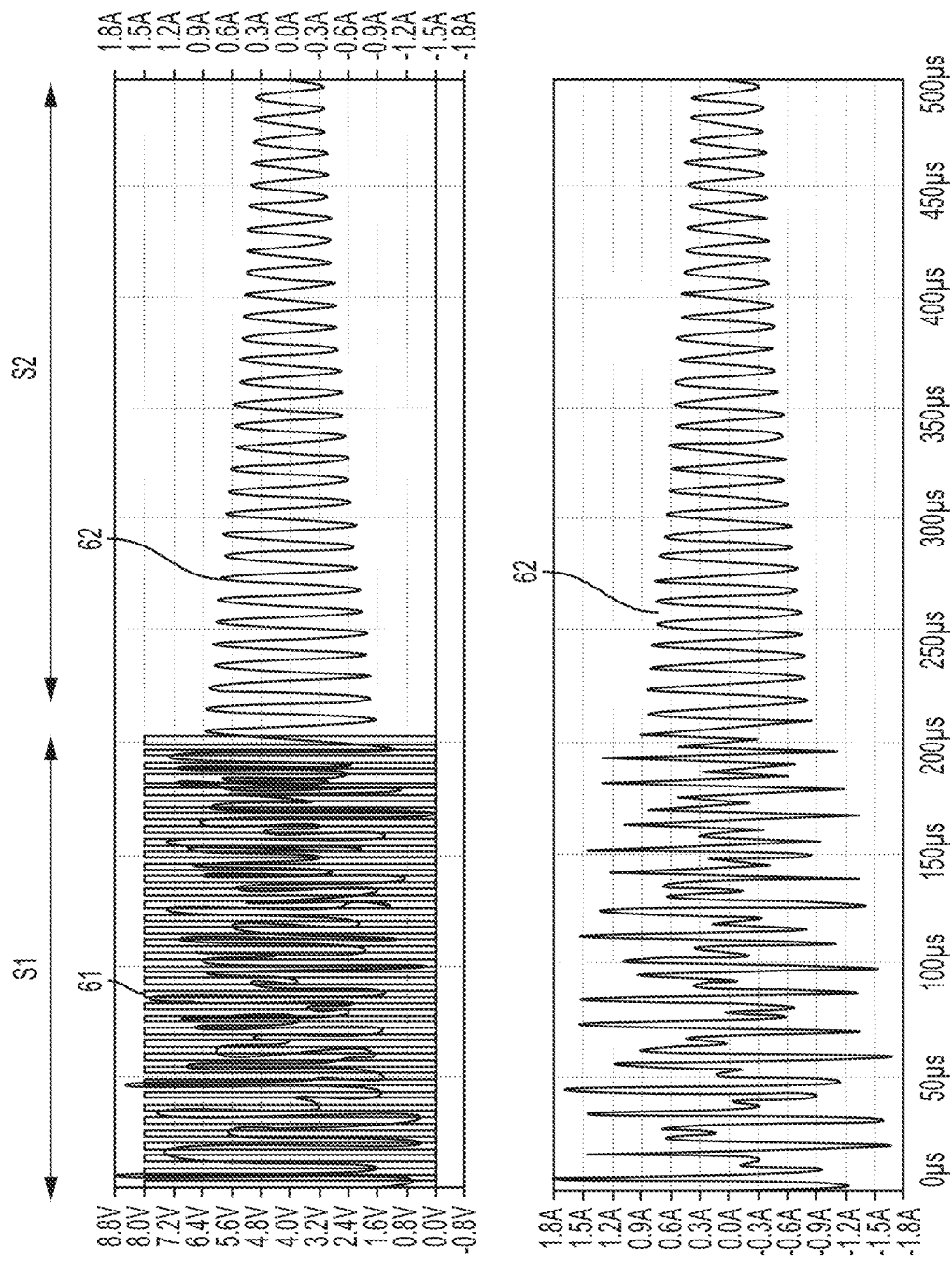
FIG. 6 shows waveforms for an example in which stimulus is performed by switching the inverter of FIG. 3C at a single switching frequency and supply voltage VDC, with no wireless power receiver present.
Figure 6:
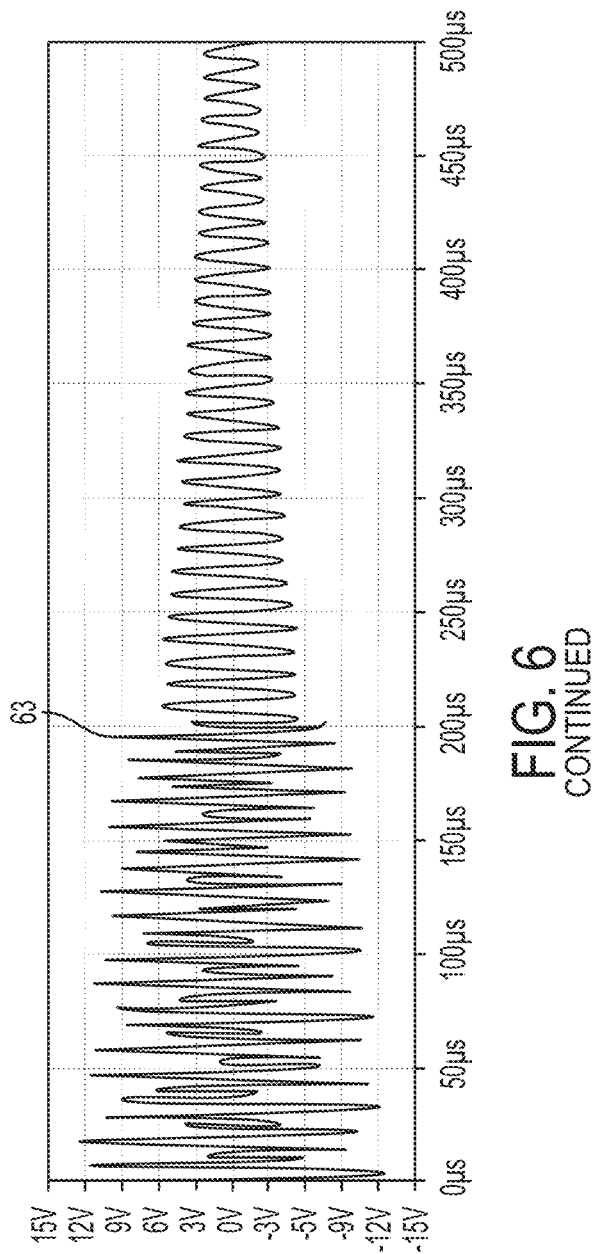

FIG. 6 shows waveforms for an example in which step S1 is performed by switching inverter 3 of FIG. 3C at a single switching frequency and supply voltage VDC, with no wireless power receiver 11 present. In this example, VDC is 8V, which causes inverter 3 to produce a square wave of 8Vpp, as shown by waveform 61. In this example, the switching frequency of the inverter 3 is 175 kHz. The switching of inverter 3 in step S1 is performed for 206 microseconds. Then, S1 ends by stopping the switching of inverter 3, and the resonance is allowed to freely decay in step S2. The current through inductor $L_{RES}$ is shown as waveform 62. The voltage of node Vres1 is shown as waveform 63. As can be seen from waveforms 62 and 63, the resonance decays freely in step S2 once the stimulus in step S1 is stopped.

Figure 7:
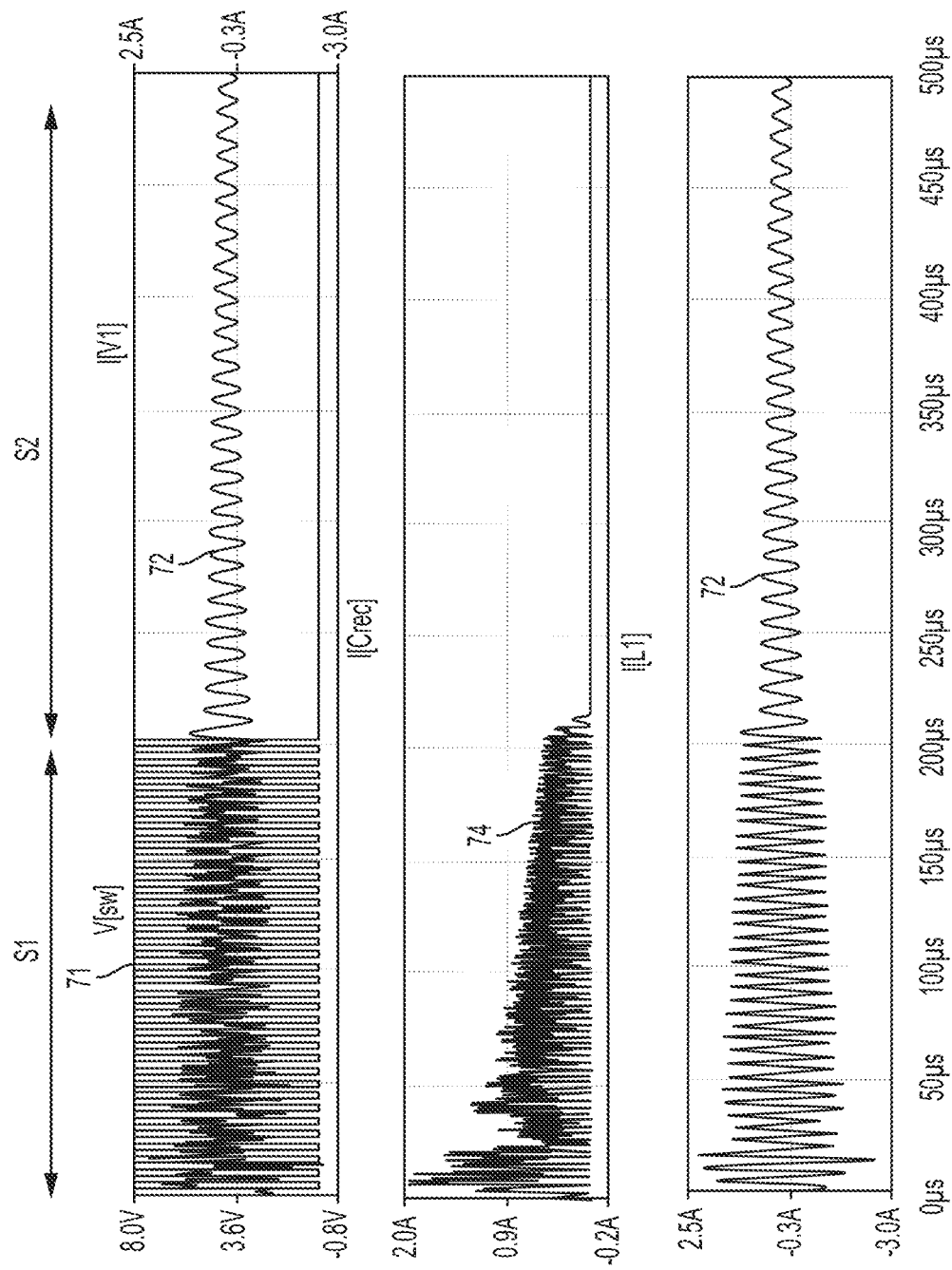
FIG. 7 shows waveforms for an example similar to FIG. 6 in which a wireless power recover is present in the field produced by the wireless power transmitter.
Figure 7:
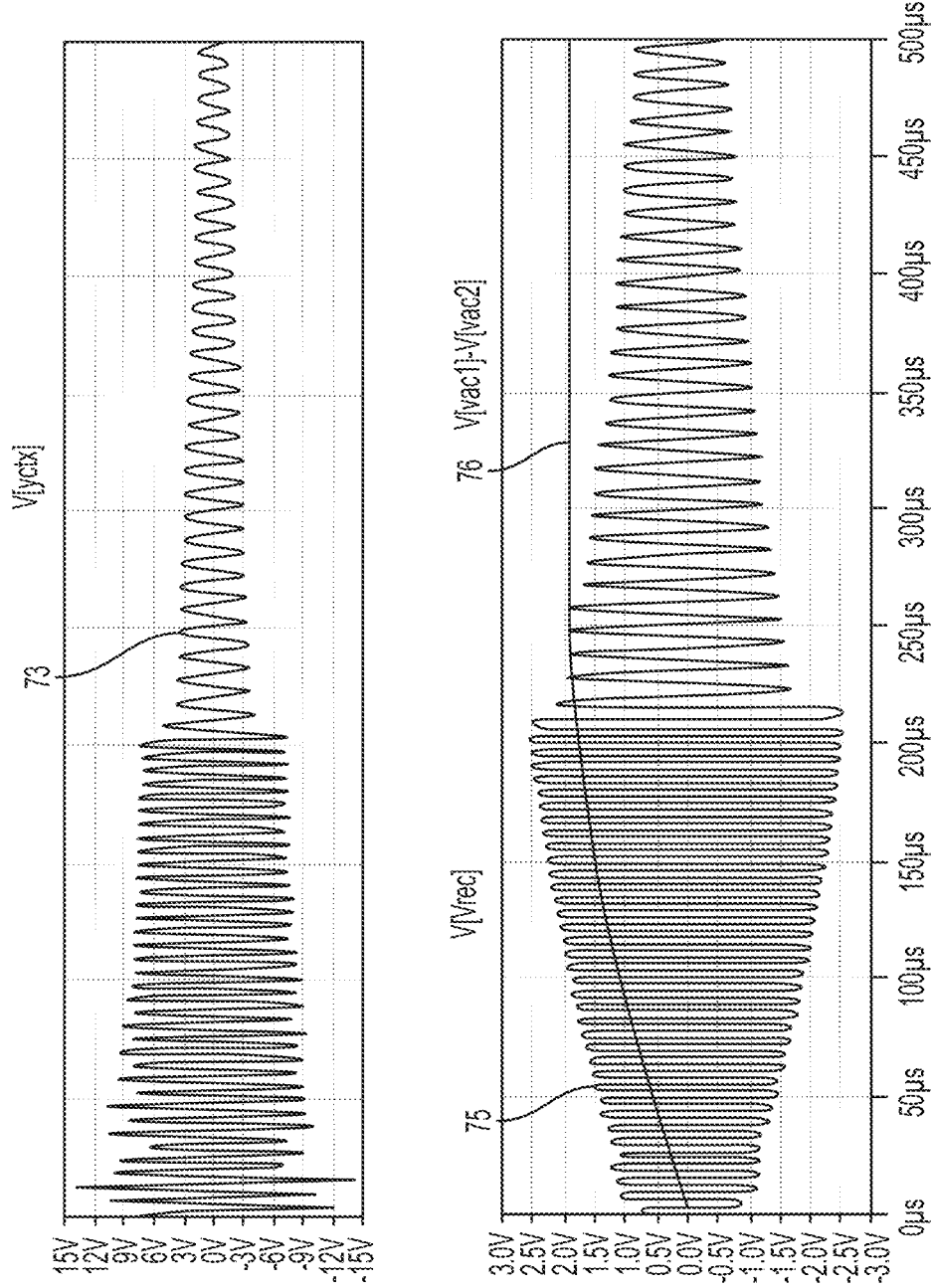

FIG. 7 shows waveforms for an example similar to FIG. 6 in which a wireless power receiver 11 is present in the field produced by the wireless power transmitter 1. The present inventors have recognized and appreciated that when a wireless power receiver 11 is present the decay of the resonance can vary depending on the state of charge of the filter capacitor of the rectifier filter capacitor Crec (FIG. 5). If Crec is not charged to a point where the diodes of the rectifier 14 are reverse-biased, the resonance at the wireless power transmitter 1 may be loaded by the wireless power receiver to charge Crec. This can affect the rate at which the resonance of the transmitter decays, which may affect the measurement of the decay, and thus impact the accuracy of foreign object detection.

FIG. 7 illustrates this problem. FIG. 7 shows the stimulus waveform 71 produced by inverter 3, waveform 72 showing the current through inductor $L_{RES}$, waveform 73 showing the voltage of node Vres1, waveform 74 showing the current through rectifier filter capacitor Crec, waveform 75 showing the voltage at the input of the rectifier 14, and waveform 76 showing the voltage across the rectifier filter capacitor Crec.

In this example, the rectifier filter capacitor Crec has a capacitor of 40 µF, by way of illustration. The stimulus waveform 71 frequency, voltage and duration are the same as that discussed above with respect to FIG. 6. In the example of FIG. 7, since the wireless power receiver is present the rectifier filter capacitor Crec charges up during the period in which the stimulus waveform 71 is applied in step S1. The inventors have recognized and appreciated that if capacitor Crec is not fully charged by the end of step S1 it may continue to charge during step S2, which may load the decaying resonance at the transmitter and skewing the measurement of the resonance decay. FIG. 7 illustrates in waveforms 76 and 74 that the rectifier filter capacitor Crec is not fully charged by the end of step S1, such that current continues to flow into the rectifier filter capacitor Crec during S2, which may adversely affect the measurement of the resonance decay.

Figure 8:
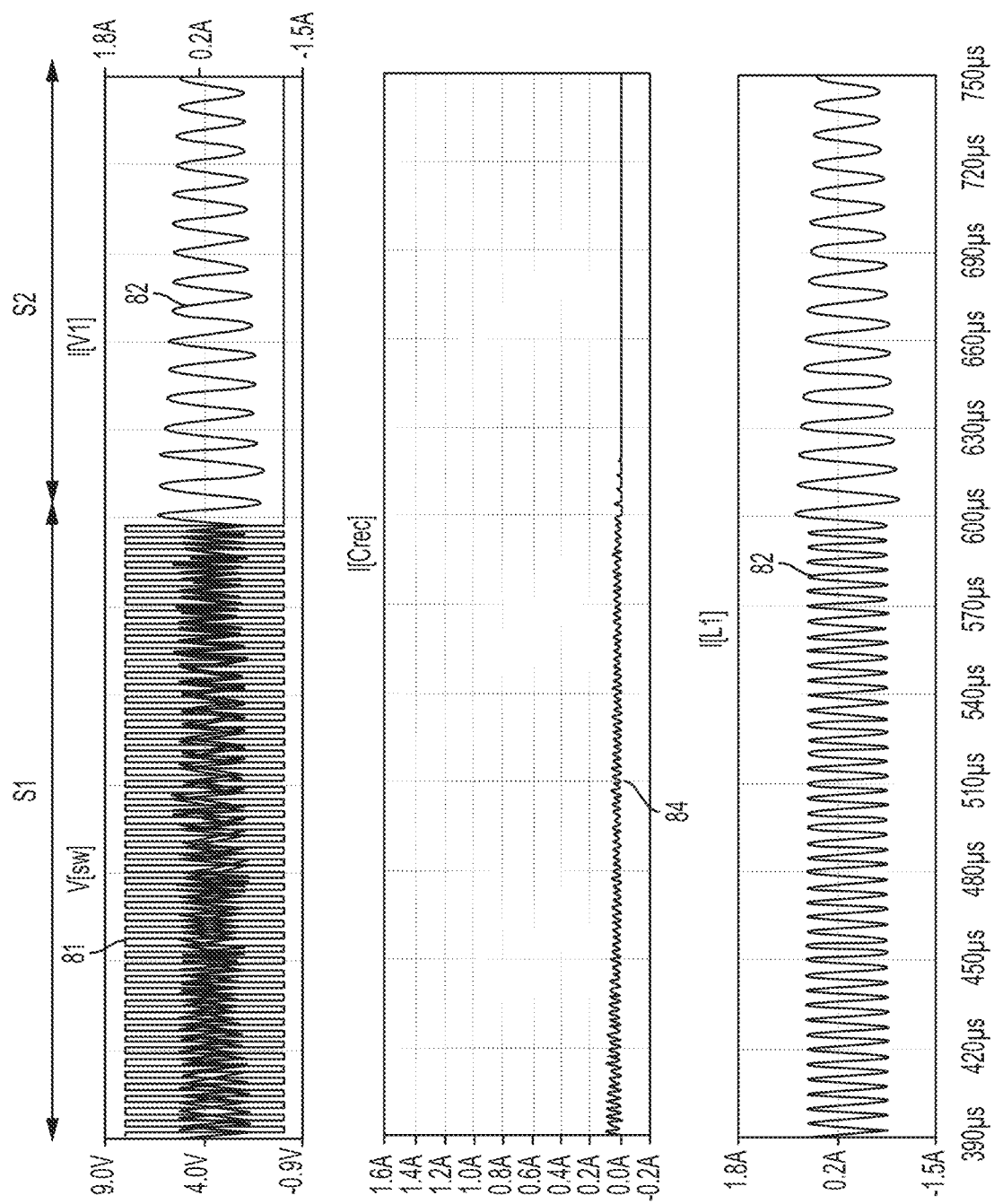
FIG. 8 shows an example of a stimulus that can fully charge the rectifier filter capacitor Crec.
Figure 8:
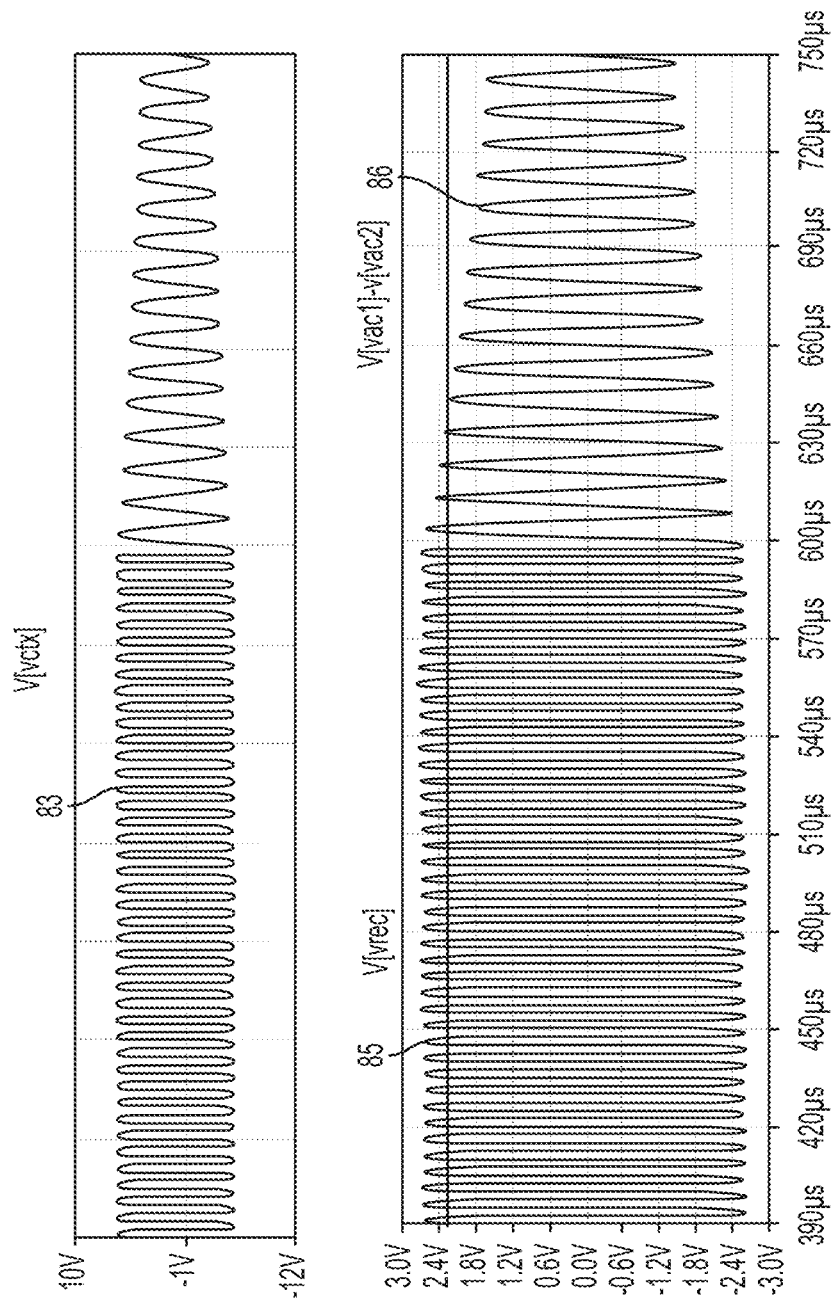

FIG. 8 shows an example of a stimulus that can fully charge the rectifier filter capacitor Crec prior to step S2. In this example, VDC is 8V, the switching frequency of the inverter 3 is 200 kHz, and step S1 lasts 600 microseconds. FIG. 8 shows the stimulus waveform 81 produced by inverter 3, waveform 82 showing the current through inductor $L_{RES}$, waveform 83 showing the voltage of node Vres1, waveform 84 showing the current through rectifier filter capacitor Crec, waveform 85 showing the voltage at the input of the rectifier 14, and waveform 86 showing the voltage across the rectifier filter capacitor Crec. As shown, the rectifier filter capacitor Crec can be fully charged before the start of step S2 by applying the stimulus for a sufficient duration. However, one disadvantage of this approach is that it involves increasing the length of step S1, which may be inefficient, as power may be dissipated during step S1.

In some embodiments, the duration of step S1 can be reduced by applying a sequence of inverter stimulus waveforms at different energy levels. The inverter stimulus waveform may have a period of time in which relatively high energy level is applied, followed by a period of time with a lower energy level applied. Using a relatively high energy level initially allows charging the rectifier filter capacitor Crec quickly. Then, the energy level can be reduced to allow improved efficiency.

Applying a sequence of inverter stimulus waveforms can include applying a "double stimulus" in which a first stimulus is applied in step S1a and a second stimulus is applied in step S1b, which may be at a lower power level than in step S1a. However, the techniques described herein are not limited to applying two different stimulus levels, as any number of different stimulus levels may be applied.

As mentioned above, the stimulus applied step S1a may be of a higher energy level than the stimulus applied in step S1b. The energy level is affected by the voltage level VDC used to power the inverter 3, the switching frequency, and the amount of time for which a stimulus is applied. Increasing VDC or the amount of time for which the stimulus is applied increases the amount of energy provided. A switching frequency close to the resonant frequency of the transmitter provides a higher energy level than a switching frequency farther away from the resonant frequency. Any combination of these parameters may be varied to adjust the energy level applied in subsequent stimulus steps S1a, S1b, etc.

Figure 9:
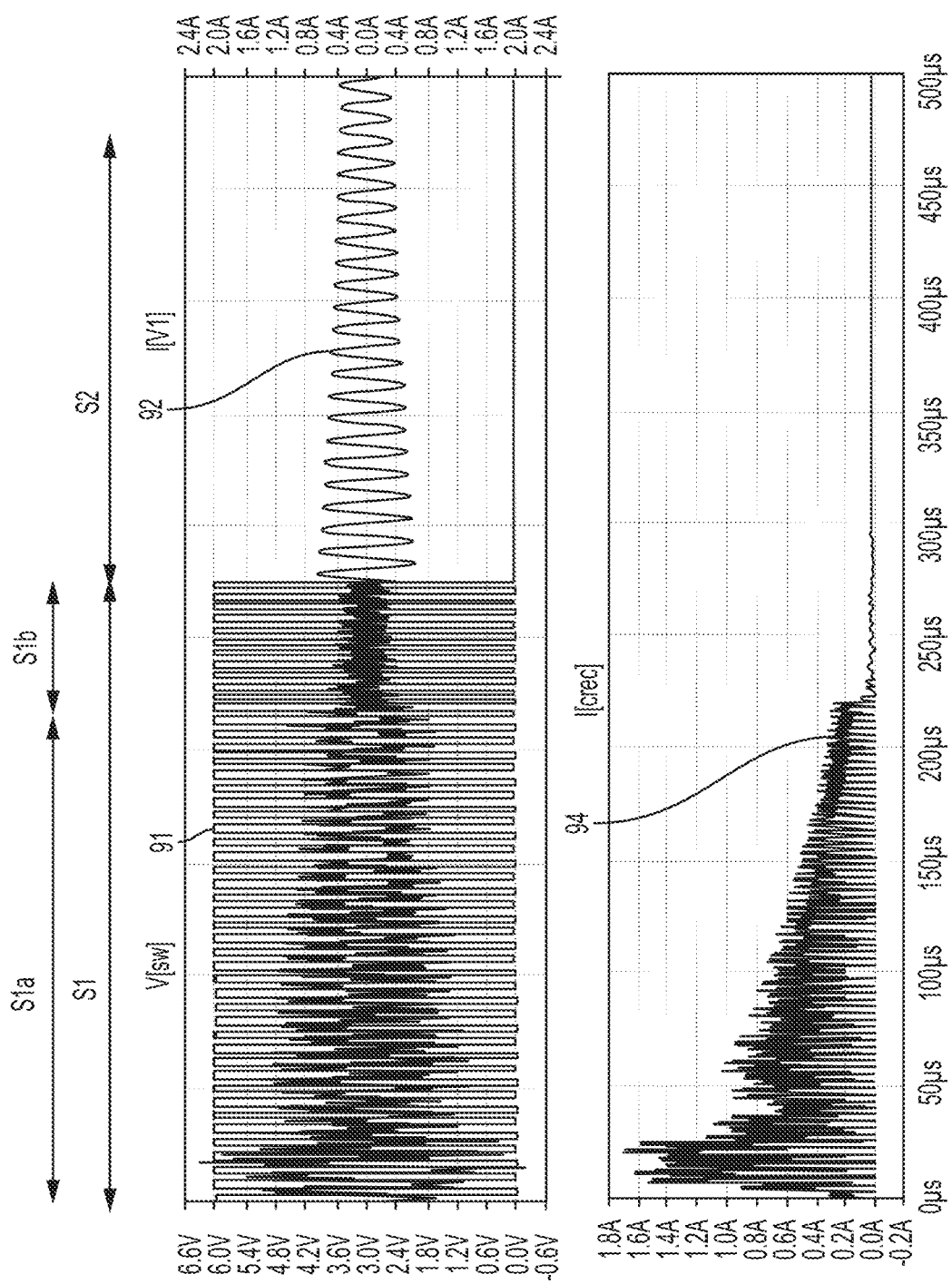
FIG. 9 shows an example of a double stimulus in which the switching frequency is changed.
Figure 9:
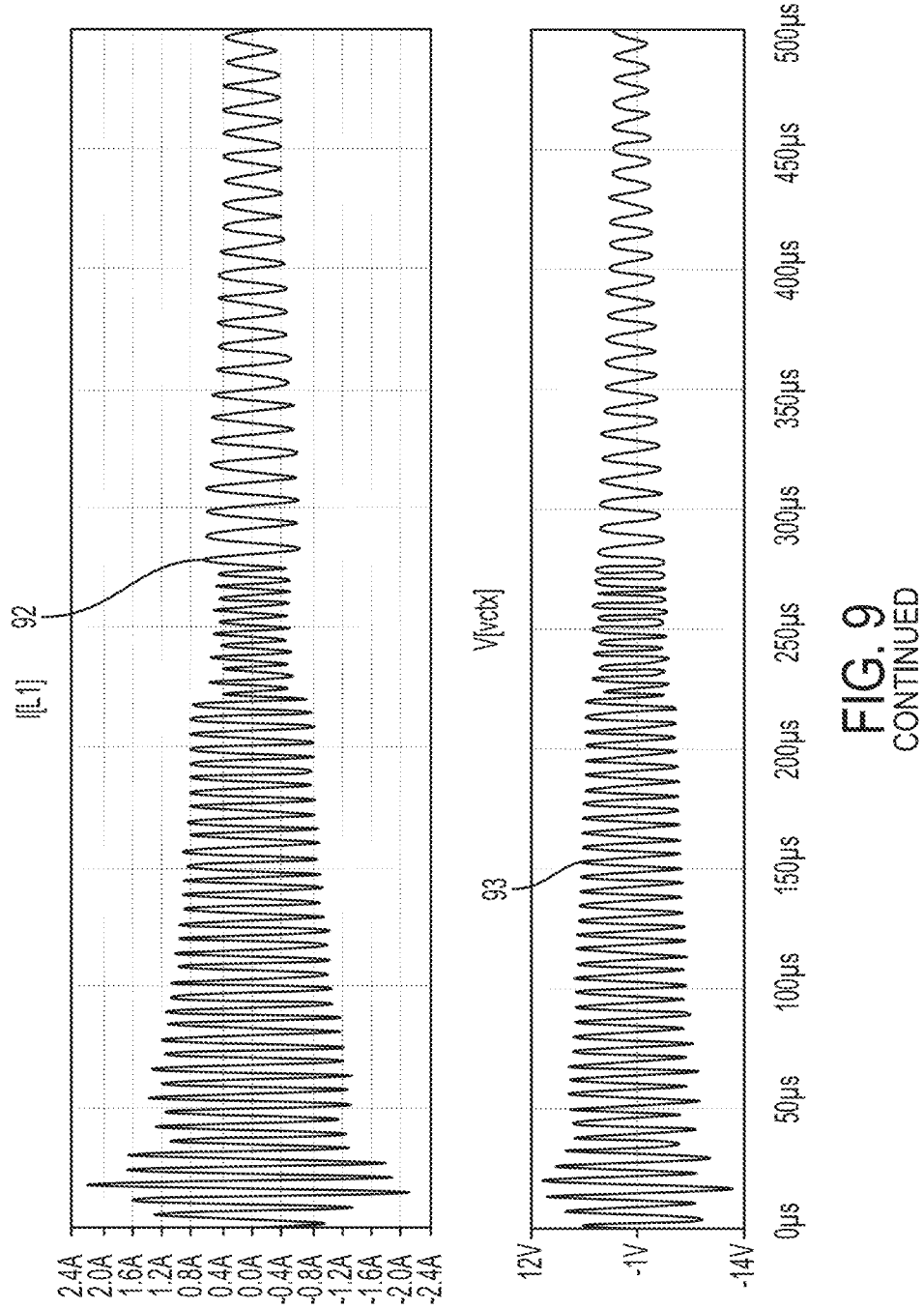
Figure 9:
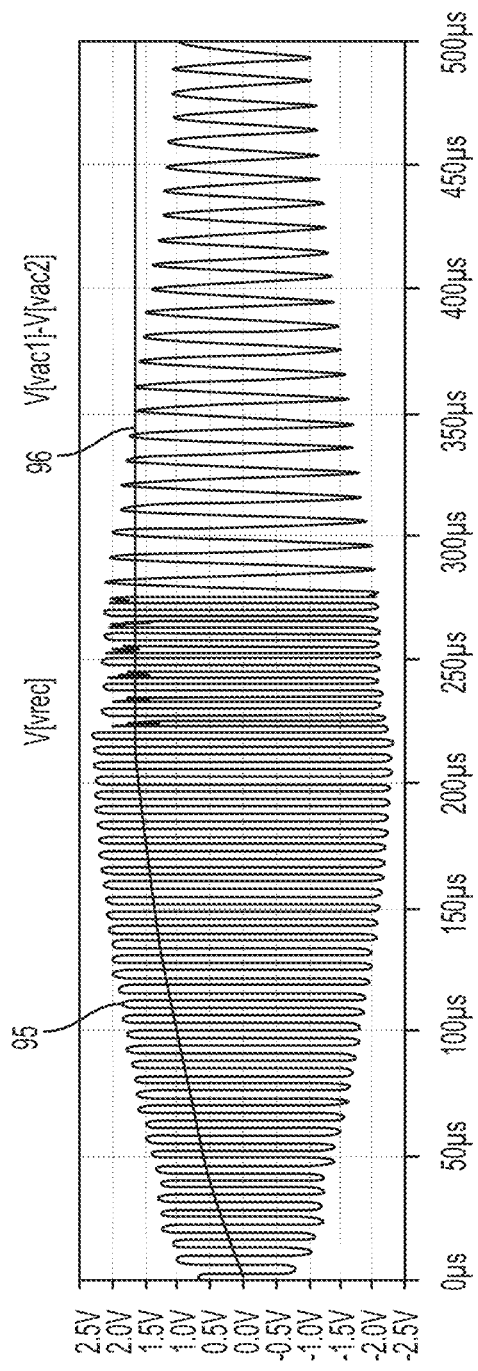

FIG. 9 shows an example of a double stimulus. FIG. 9 shows the stimulus waveform 91 produced by inverter 3 includes a first portion in step S1a and a second portion in step S1b. In step S1a, VDC is 6V, the duration is 206 µs and the switching frequency is 165 kHz. In step S1b, VDC is 6V, the duration is 60 s and the switching frequency is 200 kHz. Since the transmitter resonant frequency is approximately 100 kHz, the stimulus applied in step S1a has a switching frequency closer to the resonant frequency, which provides relatively high energy input. In step S1b, the energy is reduced by increasing the switching frequency. As shown, the rectifier filter capacitor Crec is fully charged before the start of step S2, and the duration of step S1 is less than in the example of FIG. 8. FIG. 9 also shows waveform 92 showing the current through inductor $L_{RES}$, waveform 93 showing the voltage of node Vres1, waveform 94 showing the current through rectifier filter capacitor Crec, waveform 95 showing the voltage at the input of the rectifier 14, and waveform 96 showing the voltage across the rectifier filter capacitor Crec.

Figure 10:
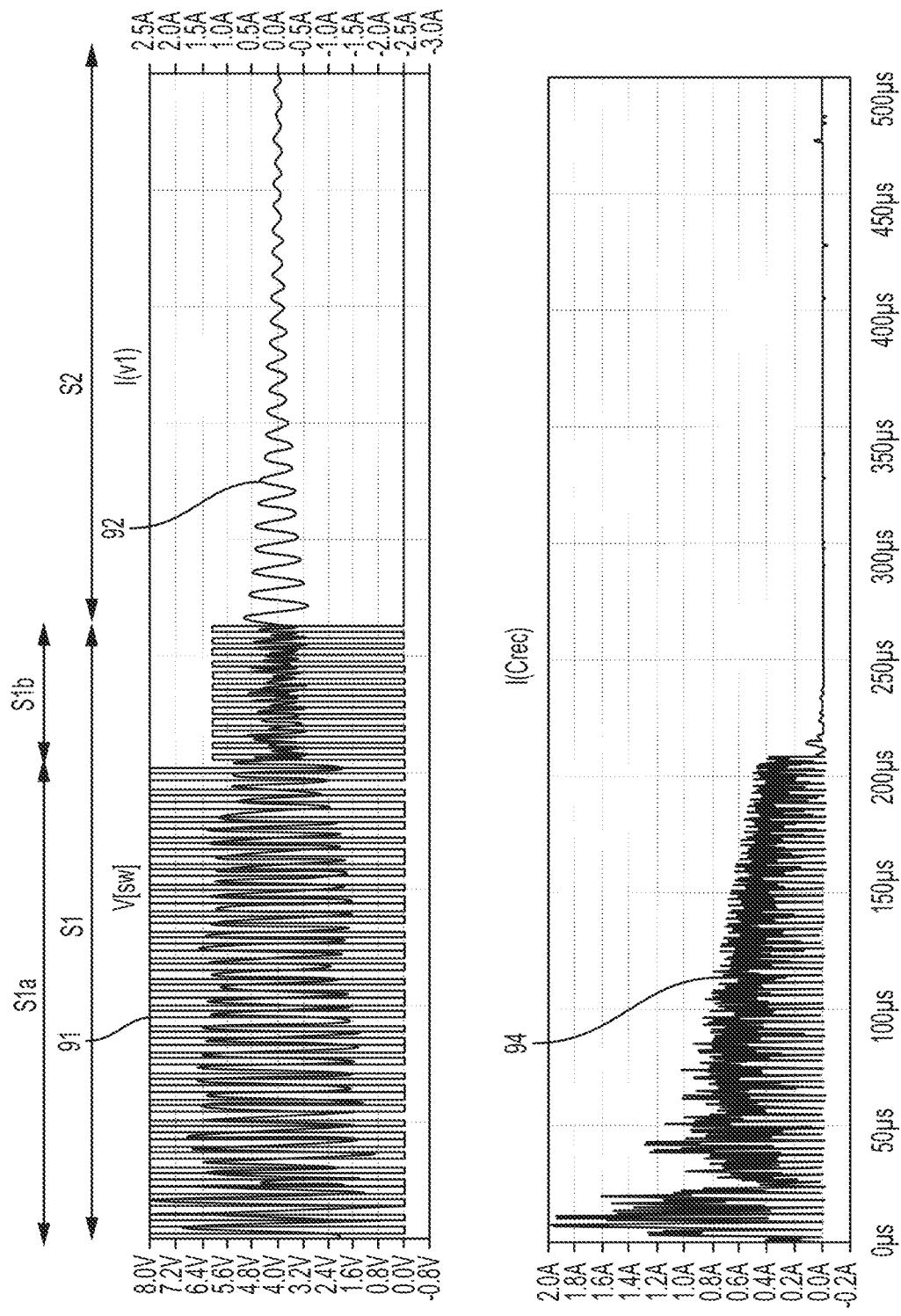
FIG. 10 shows an example of a double stimulus in which the supply voltage is changed.
Figure 10:
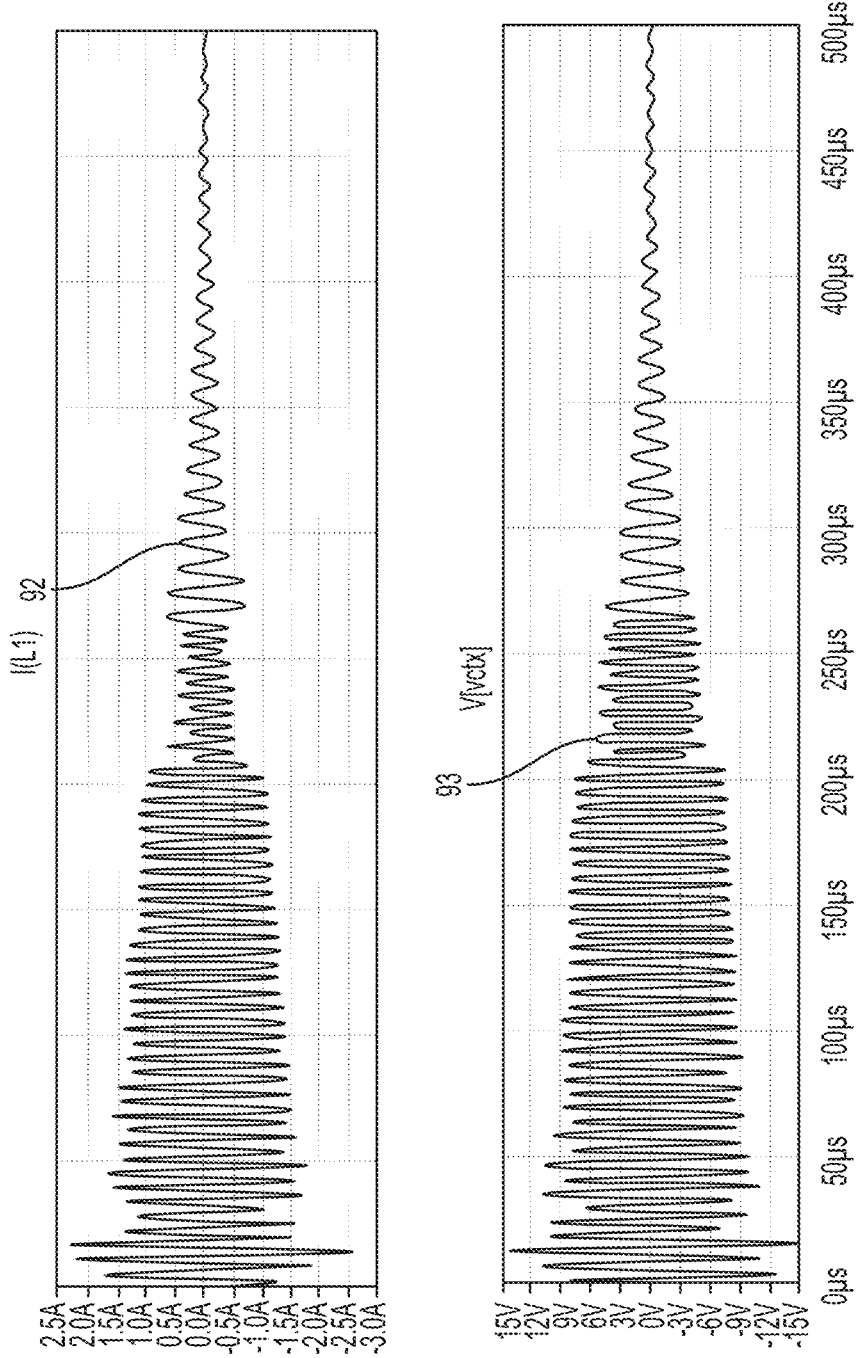
Figure 10:
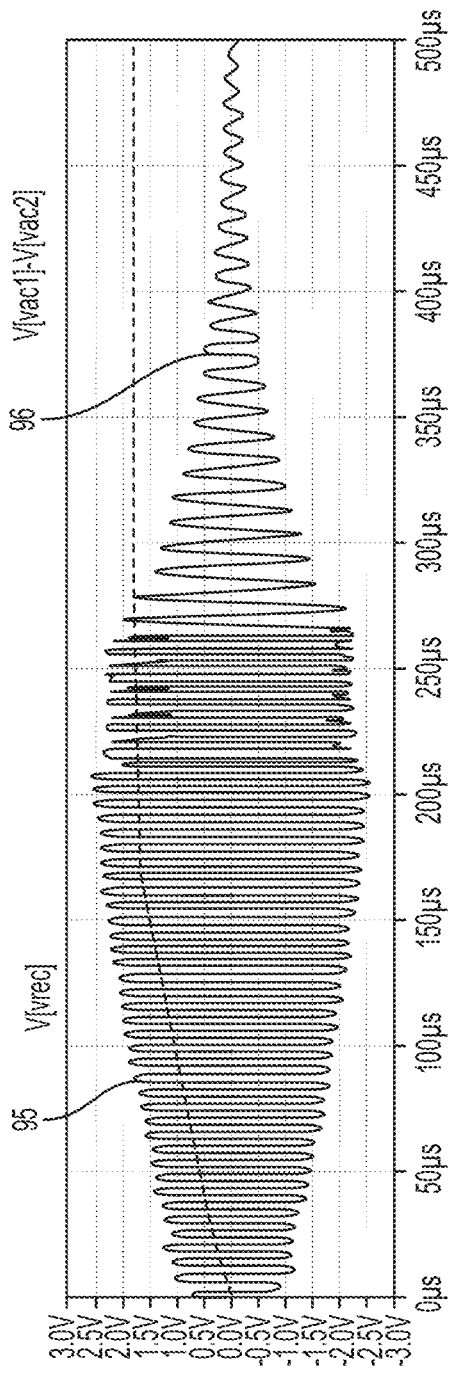

FIG. 10 shows an example of a double stimulus similar to FIG. 9, in which the energy is reduced in step S1b by decreasing the voltage VDC rather than changing the switching frequency. In this example, VDC is 8V in step S1a and then is reduced to 6V in step S1b.

Figure 11:
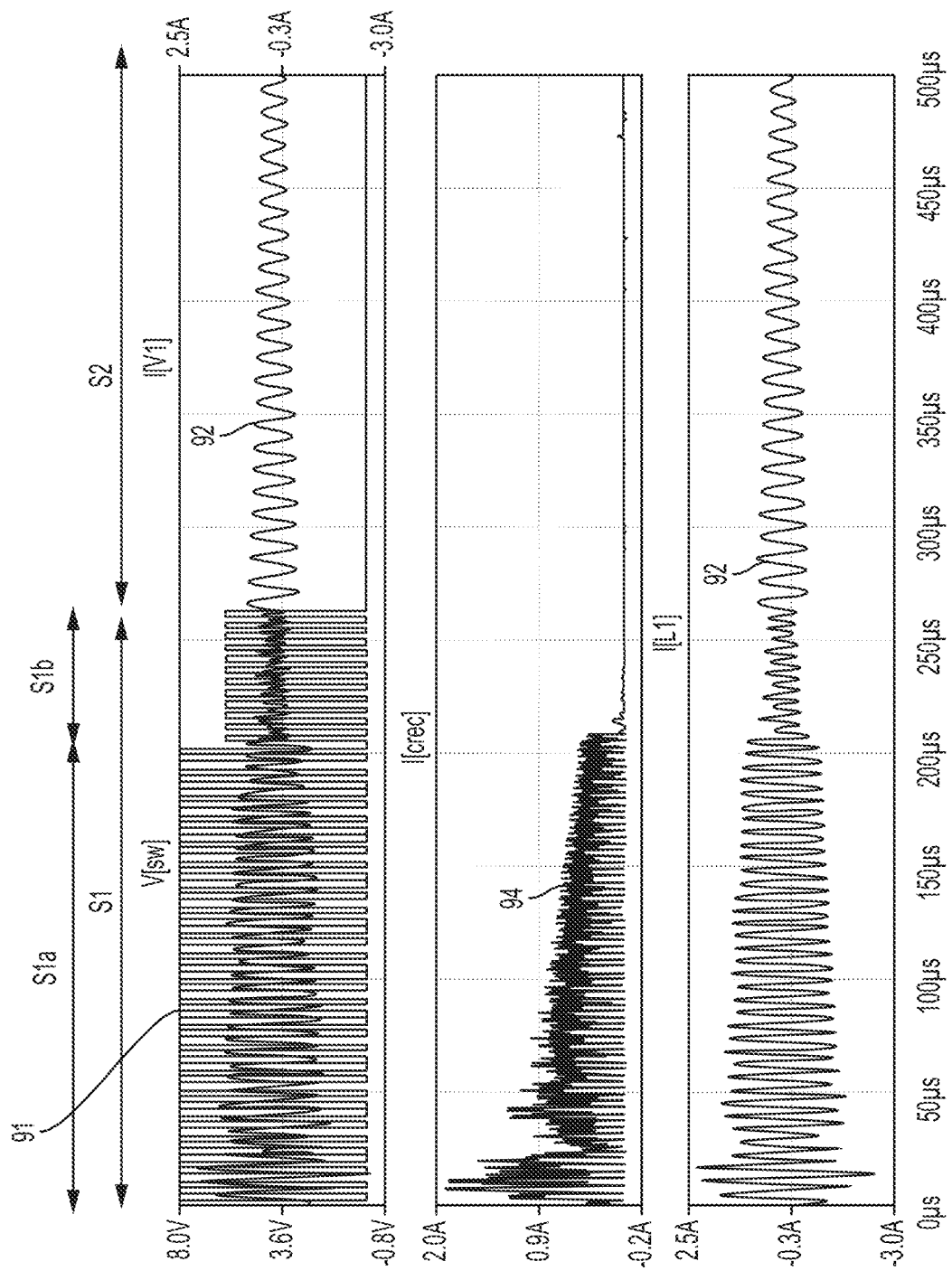
FIG. 11 shows an example of a double stimulus in which both the switching frequency and supply voltage are changed.
Figure 11:
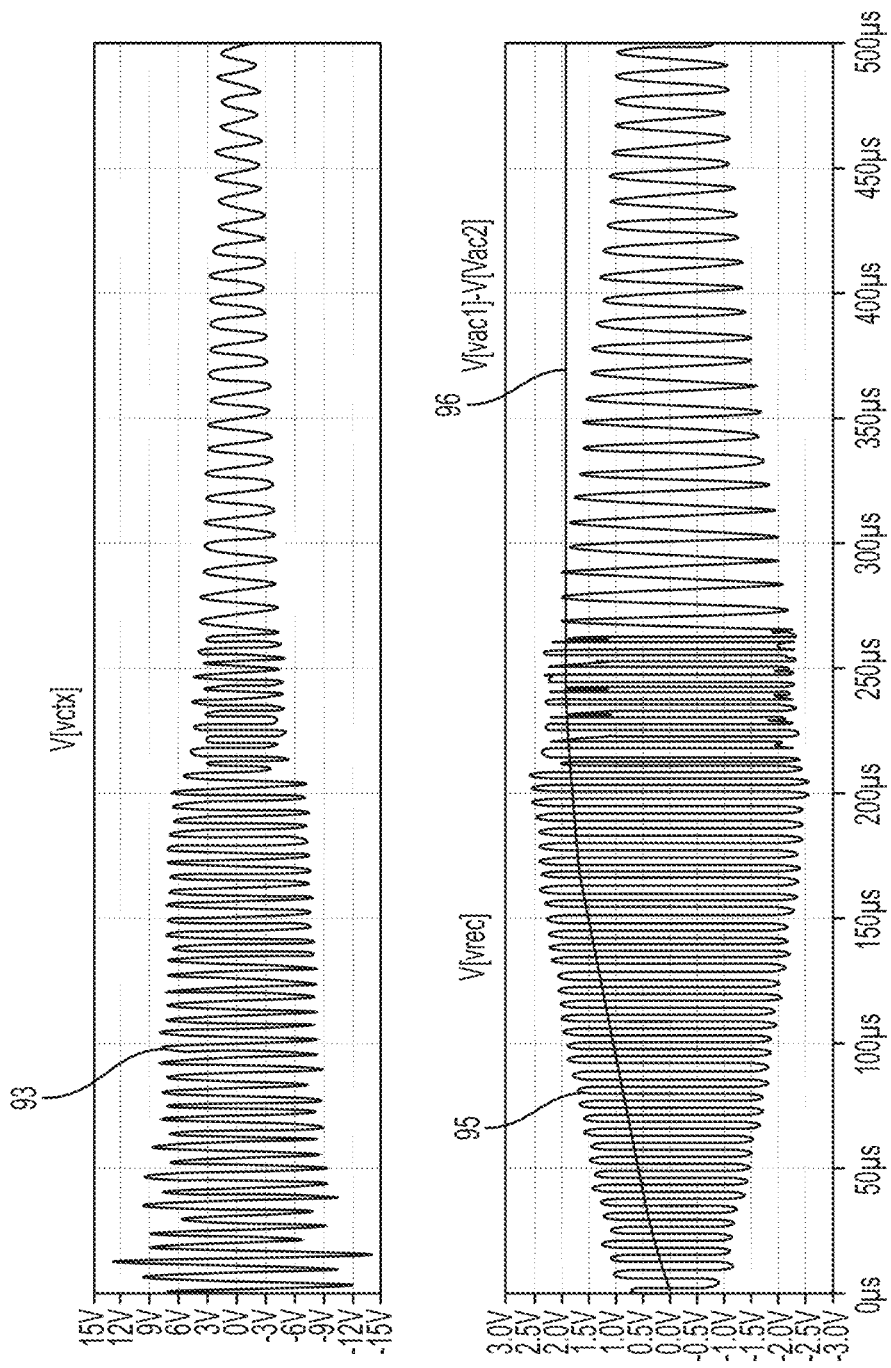

FIG. 11 shows an example of a double stimulus similar to FIGS. 9 and 10 in which the energy is reduced in step S1b both by decreasing the voltage VDC and changing the switching frequency in the way described above in FIGS. 9 and 10.

As discussed above, in step S2 the resonance of the transmitter is allowed to decay, and in step S3, a temporal characteristic of the resonance decay may be measured. For example, a decay time of the resonance decay may be measured, and/or the quality factor Q may be determined. The measurement of the temporal characteristic may be performed using continuous time or discrete time measurements.

Figure 12:
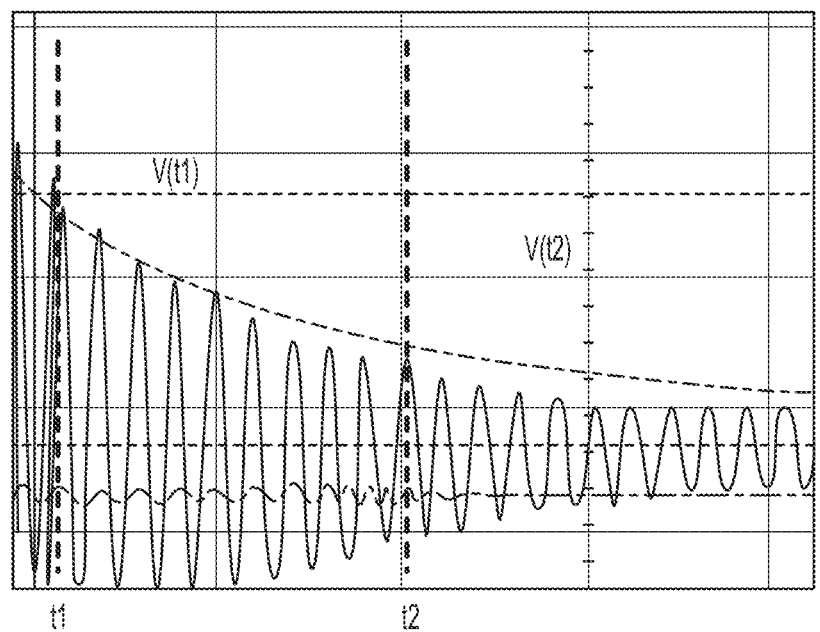
FIG. 12 shows an example of continuous time measurements.

FIG. 12 shows an example of performing the measurement of step S3 using continuous time measurements. A peak detector of controller 5 or a separate peak detector may be used to detect the envelope of the decaying waveform. As shown in FIG. 12, measurements V(t1) and V(t2) are made at times t1 and t2, respectively. The quality factor Q may be determined using the following equations.

For $Q > 10$, $$V(t) = V(0) \cdot \exp\left[\frac{-\omega \cdot t}{2 \cdot Q}\right];$$

$$\omega = \frac{2\pi}{T}$$

$$Q = \frac{\pi \cdot (t_2 - t_1)}{T \cdot \ln\left[\frac{V(t_2)}{V(t_1)}\right]};$$

Figure 13:
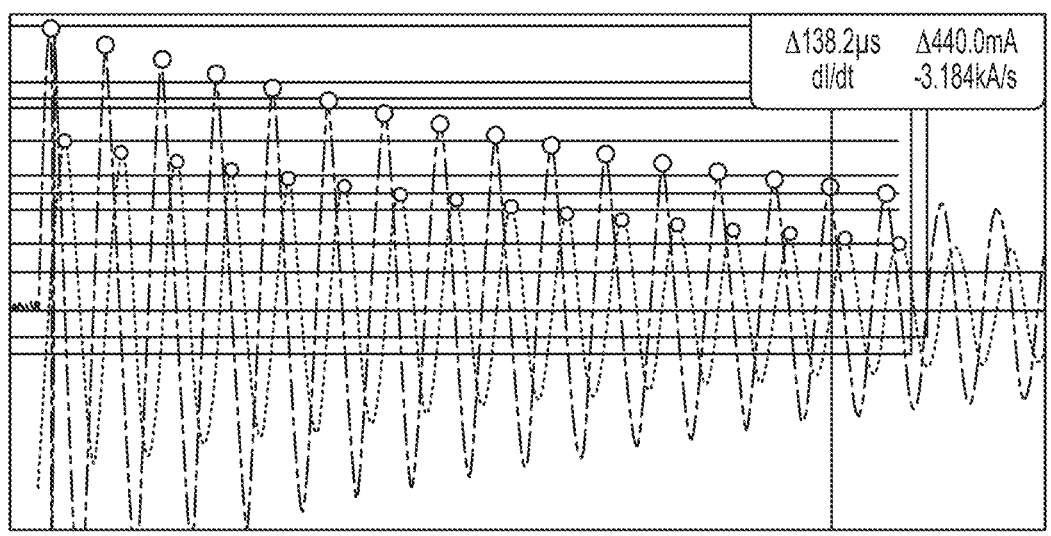
FIG. 13 shows an example of discrete time measurements.

FIG. 13 shows an example of determining Q using discrete time measurements. The peaks of the waveform as shown in FIG. 13 may be determined, then Q may be determined using the following equations.

For $Q > 10$, $$V(n) = V(0)\exp\left[\frac{-2\pi \cdot n}{2Q}\right];$$

$$Q = \frac{\pi \cdot n}{\ln\left(\frac{V(n)}{V(0)}\right)}$$

As discussed above, a multi-mode wireless power transmitter may be controlled using controller 5, which may be implemented by any suitable type of circuitry. For example, the controller 5 may be implemented using hardware or a combination of hardware and software. When implemented using software, suitable software code can be executed on any suitable processor (e.g., a microprocessor) or collection of processors. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments described herein comprises at least one computer-readable storage medium (e.g., RAM, ROM, EEPROM, flash memory or other memory technology, or other tangible, non-transitory computer-readable storage medium) encoded with a computer program (i.e., a plurality of executable instructions) that, when executed on one or more processors, performs the above-discussed functions of one or more embodiments. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A foreign object detection method for a wireless power transmitter having a matching network and transmit coil, the method comprising:
   (A) energizing the matching network and transmit coil and exciting resonance between the matching network and transmit coil;
   (B) allowing the resonance to decay;
   (C) detecting an envelope of an electrical parameter of the matching network or transmit coil as the resonance decays;
   (D) determining a quality factor using the envelope; and (E) analyzing the quality factor to determine whether a foreign object is coupled to an electromagnetic field generated by the transmit coil.

2. The foreign object detection method of claim 1, wherein (C) is performed using continuous time measurements or discrete time measurements of the electrical parameter.

3. The foreign object detection method of claim 2, wherein the electrical parameter is a voltage.

4. The foreign object detection method of claim 3, wherein (C) is further performed by a peak detector.

5. The foreign object detection method of claim 2, wherein (C) is further performed by a peak detector.

6. The foreign object detection method of claim 1, wherein (A) comprises switching an inverter of the wireless power transmitter.

7. The foreign object detection method of claim 6, wherein (B) comprises stopping the switching of the inverter and holding its output in a low impedance state.

8. The foreign object detection method of claim 1, wherein (B) is performed without energy input to the matching network or transmit coil.

9. The foreign object detection method of claim 1, further comprising:
(F) determining whether to allow or inhibit wireless power transfer based on (E).

10. At least one non-transitory computer readable storage medium having stored thereon instructions, which, when executed by a processor, perform a foreign object detection method for a wireless power transmitter having a matching network and transmit coil, the foreign object detection method comprising:
(A) energizing the matching network and transmit coil and exciting resonance between the matching network and transmit coil;
(B) allowing the resonance to decay;
(C) detecting an envelope of an electrical parameter of the matching network or transmit coil as the resonance decays;
(D) determining a quality factor using the envelope; and
(E) analyzing the quality factor to determine whether a foreign object is coupled to an electromagnetic field generated by the transmit coil.

11. An apparatus for performing foreign object detection for a wireless power transmitter having a matching network and transmit coil, the apparatus comprising:
circuitry configured to:
(A) energize the matching network and transmit coil and exciting resonance between the matching network and transmit coil;
(B) allow the resonance to decay;
(C) detect an envelope of an electrical parameter of the matching network or transmit coil as the resonance decays;
(D) determine a quality factor using the envelope; and
(E) analyze the quality factor to determine whether a foreign object is coupled to an electromagnetic field generated by the transmit coil.

12. An apparatus for driving a wireless power transmitter and performing foreign object detection, the apparatus comprising:
a drive circuit configured to energize a matching network and transmit coil of the wireless power transmitter, excite resonance between the matching network and transmit coil, and allow the resonance to decay; and
a controller configured to control the drive circuit, detect an envelope of an electrical parameter of the matching network or transmit coil as the resonance decays, determine a quality factor using the envelope, and analyze the quality factor to determine whether a foreign object is coupled to an electromagnetic field generated by the transmit coil.

13. The apparatus of claim 12, wherein the controller is configured to measure the electrical parameter using continuous time measurements or discrete time measurements.

14. The apparatus of claim 13, wherein the electrical parameter is a voltage.

15. The apparatus of claim 14, wherein the controller is configured to detect the envelope by detecting peaks of the voltage.

16. The apparatus of claim 13, wherein the controller is configured to detect the envelope by detecting peaks of the electrical parameter.

17. The apparatus of claim 12, wherein the drive circuit comprises an inverter that excites the resonance by switching of the inverter.

18. The apparatus of claim 17, wherein the drive circuit is configured to allow the resonance to decay by stopping switching of the inverter and holding its output in a low impedance state.

19. The apparatus of claim 12, wherein the drive circuit is configured to allow the resonance to decay without providing energy input to the matching network or transmit coil.

20. The apparatus of claim 12, wherein the controller is further configured to determine whether to allow or inhibit wireless power transfer based on the quality factor.

\* \* \* \* \*